Patented Feb. 2, 1943

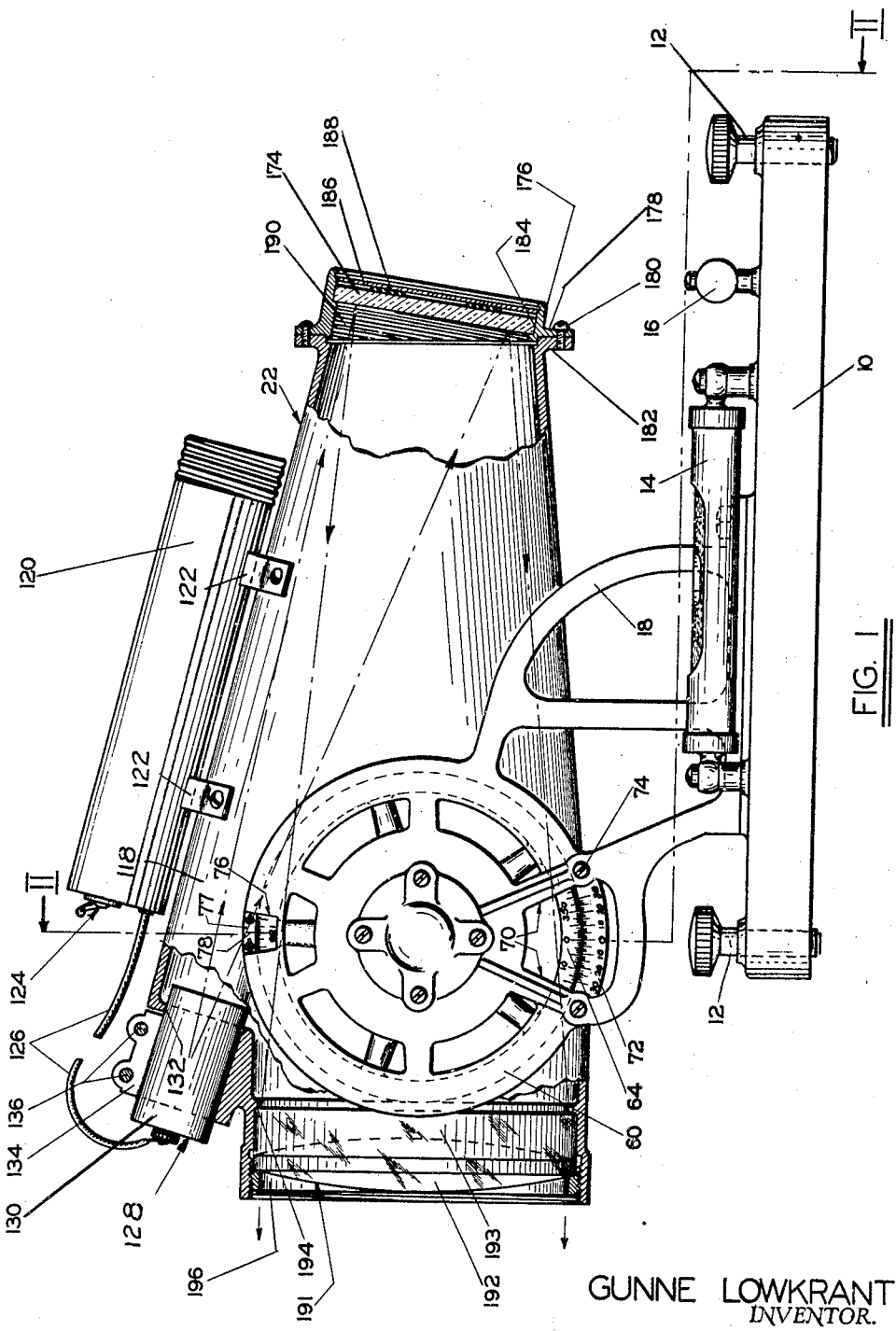

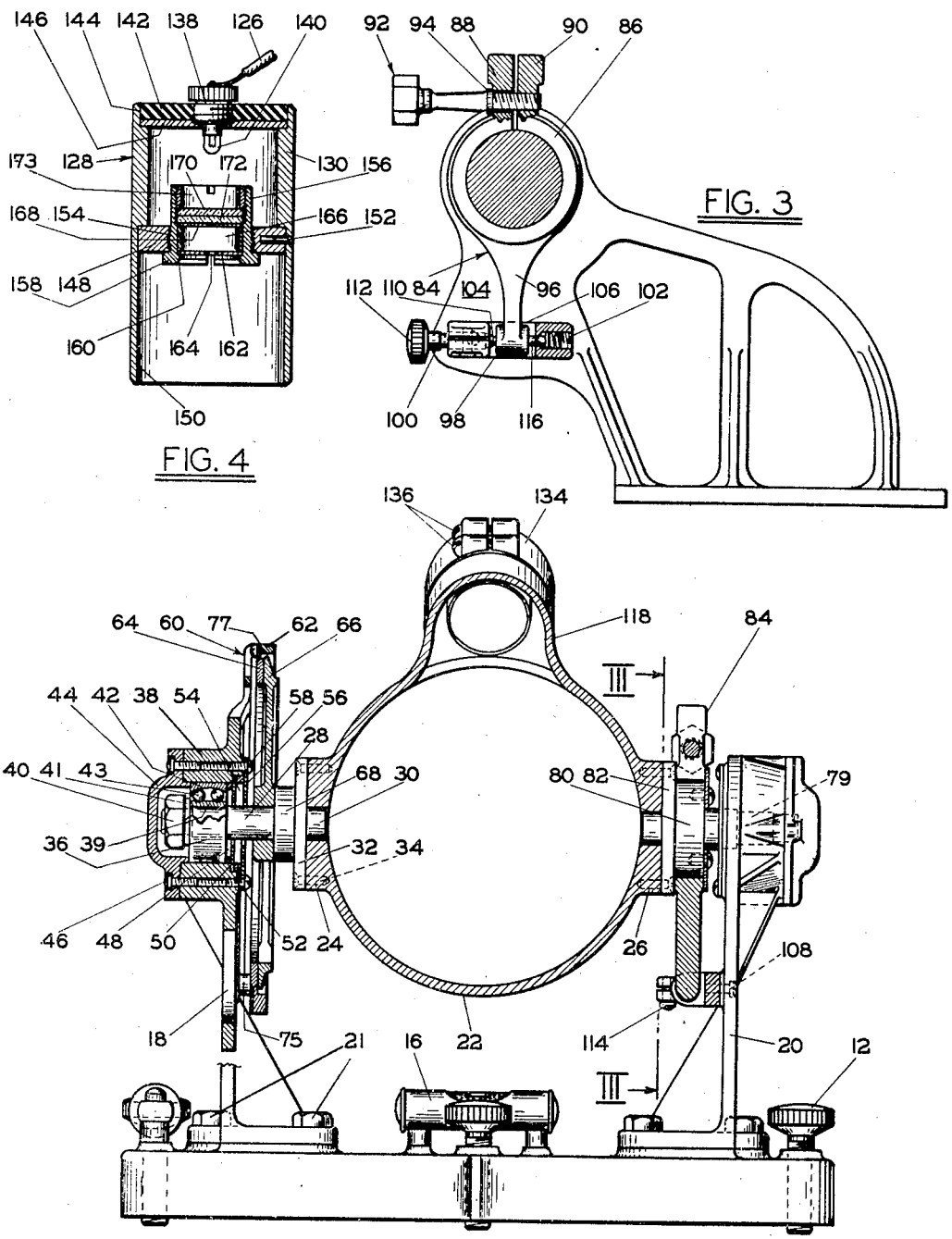

2,310,031

UNITED STATES PATENT OFFICE 2,310,031

COLLIMATOR

Gunne Lowkrantz, Binghamton, N. Y., assignor to Link Aviation Devices, Inc., Binghamton, N. Y., a corporation of New York Application May 15, 1941, Serial No. 393,644

7 Claims. (Cl. 240—1)

The present invention relates to collimators and, more specifically, to instruments of that type which project a large beam of parallel light rays and are particularly adapted for use in the testing of sextants and similar measuring instruments.

Generally speaking, it is the purpose of this invention to provide an optical collimator of unusually compact form which includes a built-in source of light that is substantially uniform, and controllable.

A further purpose of this invention resides in the provision of relatively simple and yet accurate means for supporting the tube or the longitudinal axis of the collimator in any desired position in a vertical plane.

The instrument of this invention is more specifically characterized by a base provided with levelling means, a spaced pair of brackets for supporting the collimator tube in trunnion fashion for rotation about a horizontal axis, and a conical collimator tube having a longitudinal rib-like projection with a special form of light source adjustably disposed adjacent its larger or objective end and cooperating with a reflecting mirror at the smaller end.

Another object which has been attained in the instrument of this invention is the practically complete enclosure of all moving parts which must be maintained in an extremely accurate condition.

With a collimator of the type which will be more specifically described, it is readily possible to test a sextant or like instrument on a miniature range with the required degree of accuracy. One previously employed procedure for this purpose is to adjust a series of these collimators so as to project their beams of parallel light rays in directions differing by five degrees in altitude, for example, but with the instrument of this invention accurate and rapid settings can be made enabling the users to conveniently check a sextant or the like with only one test collimator.

These and other features of the invention, including details of the optical system and the construction and arrangement of the instrument parts, will now be described as embodied in an illustrative instrument and pointed out in the appended claims.

Referring to the accompanying drawings,

Fig. 1 is a side elevation partly in section of the complete collimator instrument;

Fig. 2 shows a vertical section of this instrument taken on line II—II of Fig. 1;

Fig. 3 represents a section taken on the line III—III of Fig. 2; and

Fig. 4 shows in vertical section the artificial light source for the instrument.

In the preferred embodiment of the invention illustrated in the drawings, the numeral 10 refers to a base plate of metal of generally triangular shape provided with a set of three levelling screws 12 at its three corners which are to be adjusted with reference to a longitudinally extending bubble level 14 extending along a line parallel to the vertical plane of rotation of the instrument and a transverse bubble level 16 extending along a line at right angles to the longitudinal bubble level 14.

Fig. 2 shows the arrangement of a pair of cantilever, trunnion brackets, 18 on the left or arc side, and 20 on the right or clamping side of the instrument. It will be apparent from the drawings that the brackets 18 and 20 are arranged to provide pivotal support for rotation about a horizontal axis or in a vertical plane. The respective feet of brackets 18 and 20 are attached by a plurality of screws 21 to base plate 10.

A generally conical collimator tube 22 is pivoted near its larger end to the said brackets by means which include integral, diametrically opposed circular bosses 24 and 26 having central bores.

Adjacent the left boss 24 as viewed in Fig. 2 is a stub shaft 28 having a reduced inner end 30 closely fitted within the bore of that boss and an integral flange 32 attached to said boss by a plurality of circumferentially spaced screws 34.

On the outer end of shaft 28 is an anti-friction bearing 36 disposed within a bearing sleeve 38 integral with cantilever bracket 18. The bearing 36 includes an inner race 39 which is secured on the stepped outer end of shaft 28 by a nut 40 and lock washer 41, an outer race 42, and two rows of ball bearings 43 between the races.

A domed and shouldered cover plate 44 closes the outer end of the bearing sleeve 38 and is attached by a plurality of screws 46 to the bracket 18, one shoulder of this plate providing an outer stop or clamp for the outer race 42. A stop ring 48 of rectangular cross-section abuts the outer race 42 on its inner face and is retained by a washer 50 fitting within a counter bore 52 of bearing sleeve 38. On the inner side of washer 50 is a larger spacer ring 54 similar to ring 48 and, in turn, abutting an inner clamping washer 56 secured to bracket 18 by a plurality of attaching screws 58 near its outer edge.

Note is next to be made of a circular plate or face 60 which is integral and concentric with bearing sleeve 38 and is provided with an inturned cylindrical flange 62 for enclosing a rotatable graduated arc circle 64 secured on the outer face of an arc or scale wheel 66. The scale wheel 66 is centered on and fixed to an intermediate portion of stub shaft 28 against an integral circular shoulder 68 thereof with attaching flange 32 on its other end.

There is a gap 70 of approximately 35 degrees in circular plate 60. Below the gap 70 in plate 60 a correspondingly curved vernier segment 72 is centered and secured at its opposite ends to cantilever bracket 18 by screws 74 passed through integral spacing bosses 75 (only one of which is shown).

The circular plate 60, which is also annular, has an inwardly extending notch 76 diametrically opposed to the vernier gap 70 and arranged to expose about 15 degrees of graduated arc circle 64 and an auxiliary index plate or device 77 adjustably secured to the stationary plate 60 in the manner shown and having an engraved index line 78. In use, the index line 78 will be made to coincide with the 180-degree line on arc circle or scale 64, when the 0-degree line on this scale coincides with the 0-degree line on vernier segment 72. The purpose of the auxiliary index line 78 is to provide a means for checking the concentricity of the scale 64 on scale wheel 66, and it is used in the following manner: The 0-degree line of scale 64 is adjusted to coincide with the 0-degree line of the vernier segment 72, and the auxiliary index plate 77 is adjusted so that its line coincides with the 180-degree line on scale 64. The collimator tube 22 to which the scale wheel 66 and scale 64 are secured is now rotated through 180-degrees until the 0-degree line on scale 64 coincides with the auxiliary index line 78. If now the 180-degree line on scale 64 coincides with the 0-degree line on vernier segment 72, the 0-degree line and 180-degree line actually are diametrically opposed with reference to the center of shaft 28. If now the above test procedure is repeated, using the 90-degree and 270-degree lines on scale 64 instead of the 0-degree and 180-degree lines, and it is found that these two lines are also diametrically opposed, it may be concluded that scale 64 is concentric with the center of shaft 28 which is a condition necessary for correct reading of the collimator setting.

Fig. 2 also shows another stub shaft 79 secured on the right boss 26 of the collimator tube 22 and having its bearing support in cantilever bracket 20. In view of the fact that the mounting and support of stub shaft 79 are substantially identical with that of the opposite stub shaft 28, they will not be described in detail. It should be noted, however, that the shaft 79 has an integral collar 80 forming a somewhat smaller continuation of its attaching flange 82 and arranged intermediate of the shaft 79 for cooperation with a clamping and slow motion adjusting device indicated generally as 84; this device is best illustrated by Figs. 2 and 3.

A split sleeve 86 encircles the collar 80 of shaft 79 and is provided with a pair of upstanding lugs 88 and 90, the latter being tapped to receive the threaded end of a manually adjustable clamping screw 92. The lug 88 is bored for the free passage therethrough of screw 92 and abuts on its outer face a clamping collar 94 of said screw. The split sleeve 86 also has a downwardly extending vertical arm 96 formed with an enlarged end 98 having opposed plane faces each of which is parallel to a vertical plane passing through the horizontal pivot axis of collimator tube 22, and held between two adjustable abutments 100 and 102. As shown in the drawings, the abutments 100 and 102 are secured to a web extension 104 of cantilever bracket 20 by means of a horizontal U-shaped member 106 attached to said extension as by a pair of screws 108. It is to be observed that adjustable abutment 100 comprises a threaded rod formed with a pointed abutment end 110 and provided at its opposite end with a hand knob 112. The abutment 100 is adjustably clamped within a corresponding and split leg of U-shaped member 106 by an outwardly disposed, vertically extending screw 114 in order that the ease of turning may be adjusted to prevent slippage. On the other hand, abutment 102 comprises an adjustable, spring-pressed plunger 116 with a flat abutting end which acts yieldingly in opposing or following movement of threaded abutment 100, according to which direction the sleeve 86 is rotated.

Fig. 1 best illustrates a hollow, longitudinal projecting rib 118 of collimator tube 22 which converges in the same direction as that tube and is completely open with respect thereto. A generally conventional dry cell battery case 120 extends longitudinally of rib 118 and is attached to the outer side thereof by metal clips or tabs 122. The end of battery case 120 which is adjacent the larger end of collimator tube 22 is provided with an ordinary snap switch 124, and an insulated lead 126 extends from the same end of this case to a light source unit designated generally as 128, and including a cylindrical case 130 of metal. The metallic case 130 snugly fits and extends within a circular opening 132 in the larger end of projecting rib 118 and is aligned with a split sleeve 134, integral with tube 22, and having a pair of clamping screws 136, as indicated in Fig. 1, to the end that the light source unit may be focussed by sliding it in the sleeve 134 and opening 132.

With further reference to the details of light source unit 128, attention is now directed to the detailed showing in Fig. 4 in which a lamp socket 138 carrying a small electric lamp 140 having a small concentrated filament of high intrinsic brilliancy is threaded through an insulated disc 142 fitted into a counterbore 144 at the outer end of case 130. A metal washer 146 through which the lamp 140 passes freely is also within the counterbore 144 and on the innermost side with respect to the insulating disc 142; the metal washer 146 serves as a ground connection for one side of the lamp socket 138.

Intermediate the ends of case 130 is an internal collar 148 of substantial thickness and fitted within an opposite counterbore 150 terminating midway of said case 130. A retaining pin 152 extends transversely of the case 130 and into the collar 148. As is to be seen from this figure, the collar 148 has an internally threaded opening 154 for receiving an aperture or stop tube 156 which is, in turn, provided with a slotted head 158 engaging the inner side of collar 148. Within its head portion, the aperture tube 156 presents an inwardly projecting flange 160 serving as an abutment for an apertured plate 162, the aperture 164 of which is quite small and circular and converges in the direction of the inner end of the light source unit 128. A short length of spacing sleeve 166 engages the outer face of aperture plate 162 and supports at its other end a principal apertured plate 168 having a central pinhole opening in alignment with aperture 164. A pair of flashed opal diffusing glasses or plates 170 and 172 are mounted on the electric lamp side of principal apertured plate 168, the whole aperture assembly being retained at that side by an externally threaded sleeve 173.

It is the purpose of diffusing glasses 170 and 172 to provide an even illumination at the pinhole opening of apertured plate 168 which will serve as an artificial star. The included angle of the cone-shaped bundle of light emerging from the pinhole of apertured plate 168 is rather large (45 degrees or more), but only a very small portion of this cone is useful. The useful light in question is limited to a narrower cone, the marginal rays of which strike the periphery of the doublet objective lens 191 after reflection at mirror 174. The remainder of the large cone of light emanating from the principal apertured plate 168 would strike the inside of collimator tube 22 at various points and cause disturbing reflections if it were not for the other apertured plate 162. By means of this apertured plate 162, all but the desired useful light is intercepted and suppressed. The diameter of aperture 164 in plate 162 is so chosen in relation to its spacing from the pinhole of the principal apertured plate 168 that only the useful portion of the light is transmitted. The light source unit 128 comprising the apertured plates 162 and 168 is but one form of pattern providing means which may be used.

At the smaller end of collimator tube 22, there is mounted a plane, first surface, optical mirror 174 arranged at an angle with respect to the longitudinal axes of the collimator tube 22 and the hollow longitudinal rib 118 leading from the light source unit 128. A diagonally cut sleeve 176 contains the mirror 174 and is secured by means of a flange 178 and attaching screws 180 to a corresponding flange 182 integral with the smaller end of collimator tube 22. The sleeve 176 is counterbored at 184 to provide a stop and support for the mirror 174 which is insertable from its outer end. A retaining plate 186 is snapped into the outer end of sleeve 176 and holds the mirror 174 in place through the intervening medium of a cushioned washer 188. It is further to be noted that the inner end of sleeve 176 is corrugated at 190 to minimize the reflection of stray light.

The larger, opposite end of collimator tube 22 contains a large objective lens 191 composed of two elements 192 and 193 cemented together to form an achromatic doublet. For the purposes of such an instrument, the mirror 174 and the doublet lens 191 will be of suitable optical glass ground with the greatest precision. Lens elements 192 and 193 are of the same diameter and fit snugly within the larger end of collimator tube 22 to a position of abutment with an internal stop flange 194. An externally threaded retaining ring 196 is arranged in threaded engagement with tube 22 so as to secure lens unit 191 in its required position.

The compound optical system thus provided reduces by substantially one-half the required overall length of the collimator, since the plane reflecting mirror 174 directs the cone of light received from the indicated focus at the approximately point source of unit 128 as an expanding cone toward the objective lens 191, where it is refracted in a manner which will be understood, and emanates from the instrument as a cylindrical bundle of parallel light rays.

The diameter of objective lens 191 is sufficiently great to provide a substitute for a light source at infinite distance and thus facilitate the testing of instruments such as sextants, where a short range and a limited amount of movement in a plane perpendicular to the light source are practical, limiting conditions. With the pivotal support which has been provided for the collimator tube 22 and described fully above, the instrument of this invention may be accurately set in a vertical plane and fulfill the primary purpose of an artificial equivalent of a celestial body whose altitude is to be measured.

Although only the preferred form which this invention may assume has been illustrated and described in detail, it will be apparent to those skilled in the art that the invention is not so limited, but that various modifications can be made without departing from the spirit of the invention or the scope of the appended claims.

Having thus described the invention, what is claimed as new and desired to be secured by Letters Patent of the United States is:

1. A collimator which comprises, in combination, a collimator tube, a plane reflecting surface adjacent one end of said collimator tube, an objective lens adjacent the other end of said collimator tube, and built-in means for providing an approximately point source of light positioned at one side of said collimator tube and adjacent the same end as said objective lens, the reflecting surface, objective lens, and light source means being formed and arranged to take light from a focus at the light source means and to redirect that light externally of the collimator tube as a relatively large bundle of parallel rays.

2. A collimator which comprises, in combination, a collimator tube, a reflecting mirror adjacent one end of said collimator tube, an objective lens adjacent the other end of said collimator tube, and aperture means for providing an approximately point source of light positioned at one side of said collimator tube and adjacent the same end as said objective lens, the reflecting mirror, objective lens, and aperture means being formed and arranged to take light from the aperture means as a focus and to redirect that light externally of the collimator tube as a relatively large bundle of parallel rays.

3. A collimator which comprises, in combination, a collimator tube; a reflecting mirror adjacent one end of said collimator tube; an objective lens adjacent the other end of said collimator tube; aperture means for providing an approximately point source of light positioned at one side of said collimator tube and adjacent the same end as said objective lens, the reflecting mirror, objective lens, and aperture means being formed and arranged to take light from the aperture means as a focus and to redirect that light externally of the collimator tube as a reatively large bundle of parallel rays; and means pivotally supporting said collimator tube for rotation in a single plane.

4. A collimator which comprises, in combination, a collimator tube; a reflecting mirror adjacent one end of said collimator tube; an objective lens adjacent the other end of said collimator tube; aperture means for providing an approximately point source of light positioned at one side of said collimator tube and adjacent the same end as said objective lens, the reflecting mirror, objective lens, and aperture means being formed and arranged to take light from the aperture means as a focus and to redirect that light externally of the collimator tube as a relatively large bundle of parallel rays; means pivotally supporting said collimator tube for rotation in a single plane; and scale means constructed and disposed to measure the angular position of said collimator tube in that plane.

5. An instrument of the character described comprising, in combination; a collimator tube, said collimator tube having a longitudinal projection in the form of a hollow rib; a light source unit, including an aperture for reducing the effective size of the cone of transmitted light, positioned within one end of the rib of the collimator tube and directed toward the other end; means for holding the light source unit adjustably in its position for focussing; a plane reflecting mirror at the end of the collimator tube toward which the light source is directed and angularly disposed so as to receive a cone of light and turn it as an expanding cone in an opposite direction toward the light source end of the collimator tube, said collimator tube being of generally conical shape and expanding in the direction of the cone of light which it encloses; and an objective lens at the larger end of the collimator tube formed to converge the cone of light and transmit it as a cylindrical bundle of parallel rays.

6. An instrument of the character described comprising, in combination; a collimator tube, said collimator tube having a longitudinal, tapering projection in the form of a hollow rib; a cylindrically shaped light source unit, including a diffusing glass and spaced apertured plates for reducing the effective size of the cone of transmitted light, positioned within one end of the rib of the collimator tube and directed toward the other end; means for clamping the light source unit adjustably in its position for focussing; a plane reflecting mirror at the end of the collimator tube toward which the light source is directed and angularly disposed so as to receive a cone of light and turn it as an expanding cone in an opposite direction toward the light source end of the collimator tube, said collimator tube being of generally conical shape and expanding in the direction of the cone of light which it encloses; and an achromatic objective lens at the larger end of the collimator tube formed to converge the cone of light and transmit it as a cylindrical bundle of parallel rays.

7. A collimator which comprises, in combination, a collimator tube, a reflecting surface adjacent one end of said collimator tube, an objective lens adjacent the other end of said collimator tube, means for providing a pattern in the focal plane of said objective lens, the pattern thus provided being positioned at one side of said lens and adjacent the same end as said lens, said reflecting surface being arranged to redirect light rays from the pattern through said objective lens, and said lens rendering parallel the rays emanating from said collimator.

GUNNE LOWKRANTZ.